United States Patent [19]
Stieler et al.

[11] 3,882,794
[45] May 13, 1975

[54] SNUBBED AXLE RAILWAY BOGIE

[75] Inventors: Gerhard Stieler, Minden; Alfred Sinhoff, Wurselen; Otto Halmschlag, Oberforstbach; Ferdinand Weckmann, Aachen, all of Germany

[73] Assignee: Waggonfabrik Talbot, Aachen, Germany

[22] Filed: Feb. 12, 1973

[21] Appl. No.: 331,546

[30] Foreign Application Priority Data
Feb. 10, 1972  Germany............................ 2206290

[52] U.S. Cl.............. 105/224 R; 105/222; 105/223; 188/251 M
[51] Int. Cl......... B61f 5/36; B61f 5/56; B61f 15/06
[58] Field of Search.......... 105/79, 223, 224 R, 222; 188/251 M

[56] References Cited
UNITED STATES PATENTS

| | | | |
|---|---|---|---|
| 2,095,805 | 10/1937 | Frank | 188/251 M |
| 2,322,050 | 6/1943 | Newell | 105/79 |
| 2,962,981 | 12/1960 | Peras | 105/224 R X |
| 2,963,987 | 12/1960 | Cottrell | 105/224 R |
| 3,394,662 | 7/1968 | Weber | 105/224 R X |
| 3,517,620 | 6/1970 | Weber | 105/224 R X |

FOREIGN PATENTS OR APPLICATIONS

| | | | |
|---|---|---|---|
| 636,150 | 12/1963 | Belgium | 105/223 |
| 2,018,429 | 5/1970 | France | 105/223 |

Primary Examiner—M. Henson Wood, Jr.
Assistant Examiner—Howard Beltran
Attorney, Agent, or Firm—Walter Becker

[57] ABSTRACT

A bogie for rail vehicles with a bogie frame which by means of pairs of helical springs rests on wheel axles which have their axle bearing housings guided in axle bearing guiding means of the bogie in vertical and horizontal direction for cushioning and absorbing transverse shocks occurring during the drive of the bogie. The helical springs are arranged on one side of each axle bearing housing between the axle bearing guiding means and the axle bearing housing, whereas on the other side the upper spring dish is through a spring link linked to the axle guiding means and acts upon a pushrod displaceably mounted in the axle bearing guiding means and is adapted to be pressed against the axle bearing housing through friction lining which for purposes of differently cushioning the vertical and horizontal movements of the axle bearing housing comprises different friction surfaces and is arranged between the pushrod and the axle bearing housing on one hand and between the axle bearing guiding means and the axle bearing housing on the other hand.

12 Claims, 9 Drawing Figures

3,882,794

SNUBBED AXLE RAILWAY BOGIE

The present invention relates to a bogie for rail vehicles with a bogie frame which by means of helical springs arranged in pairs rests on the wheel axles which with their axle bearing housings are guided in axle bearing guiding means of the bogie frame in vertical and horizontal direction for cushioning and absorbing the transverse shocks as they occur during the driving of the respective rail vehicle. The helical springs are arranged on one side of each axle bearing housing directly between the guiding means for the axle bearing and the axle bearing housing whereas on the other side the upper spring dish is by means of a spring link inclined to the wheel axle linked to axle bearing means and acts upon a pushrod which is displaceably journalled in the axle bearing means and is adapted to be pressed against the axle bearing housing through the intervention of friction linings.

Bogies of this type are known. By linking the upper dish of the spring of one of the helical springs arranged in pairs per each axle bearing housing by means of a link inclined to the wheel axle, the force acting upon the spring link is divided into two components and, more specifically, into a vertical component which is conveyed to the wheel axle through the lower spring dish and the axle bearing housing and into a horizontal component which by the upper spring dish is conveyed to the pushrod. The pushrod is by this horizontal force component pressed against the axle bearing housing so that its movement is cushioned in the axle bearing means in view of the occurring friction. The cushioning is effected in conformity with the load to be absorbed by the respective wheel axle.

With the described heretofore known design of the bogie, the same damping or cushioning values are obtained for the vertical and the horizontal movement of the axle bearing housing in the axle bearing guiding means. As a result thereof, with a certain damping of the vertical movement, as it is necessary for a good cushioning effect, the same damping also will have to be put up with for the horizontal movement, even though it would be preferable to dampen the horizontal or transverse movements resulting in the rails from the continuous sinoidal running of the wheel sets of the rail vehicle, in a different way than the cushioning or damping of the vertical movements.

In order to reduce the abutment shocks occurring in horizontal direction, which can under certain circumstances cause a derailment of the rail vehicle, to a minimum, with a design having a short transverse play of the axle a certain frictional force is necessary in the guiding means for the axle which, with the heretofore known design, is realized by the selction of the inclination of the spring links. While in this way a favorable damping of the transverse movements of the axle bearing housing in the guiding means for the axle bearing is realized, it is necessary at the same time to put up with a corresponding damping of the shock absorption of the rail vehicle in vertical direction which damping unfavorably influences the running properties of the rail vehicle.

It is, therefore, an object of the present invention to provide a bogie of the above described general character with a load-dependent damping system which will overcome the above mentioned drawbacks and will make an optimum damping possible in vertical as well as in horizontal direction.

It is another object of this invention to provide a bogie as set forth in the preceding paragraph which can be built up with structural elements most of which are heretofore known and used in bogies so that a rebuilding of existing rail vehicles in conformity with the present invention will be possible without difficulties.

These and other objects and advantages of the invention will appear more clearly from the following specification in connection with the accompanying drawings, in which.

Figure 1:
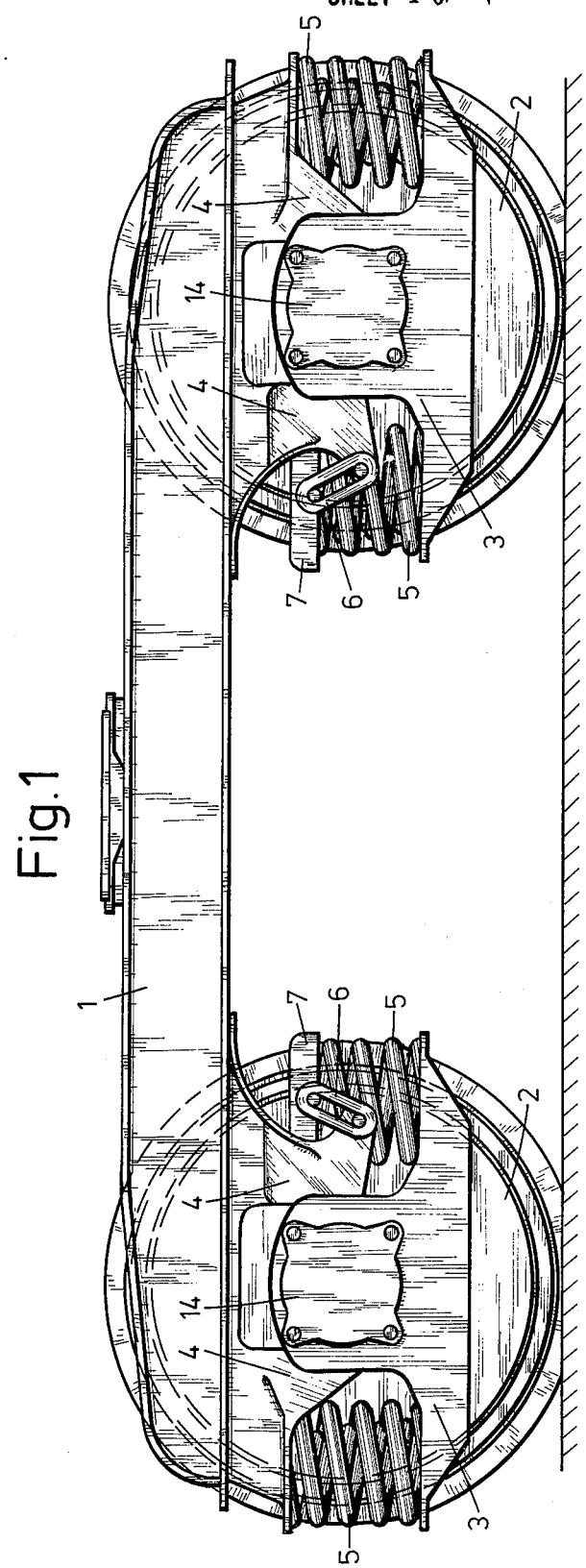
FIG. 1 is a side view of a bogie according to the present invention.

The bogie according to the present invention is characterized primarily in that for a different cushioning of the vertical and of the horizontal movements of the axle bearing housing there are provided separate friction surfaces between the pushrod and the axle bearing housing on the one hand and between the axle bearing guiding means and the axle bearing housing on the other hand. To this end, between the pushrod and the axle bearing housing and also between the axle bearing guiding means and the axle bearing housing there are respectively arranged each which in vertical or horizontal direction are non-displaceably arranged on the axle bearing housing and in the respective other direction on the axle bearing guiding means.

By providing separate friction surfaces for the cushioning of the vertical and horizontal movements of the axle bearing housing in the axle bearing guiding means, there exists the possiblity of being able by selecting the respective friction lining to determine the damping or cushioning in vertical and in horizontal direction and the respective magnitude thereof as well as the relationship of these two different dampings so that optimum running properties can be realized for a rail vehicle equipped with the bogie according to the invention. Inasmuch as the carriage according to the invention may with already existing bogies be arranged between the axle bearing housing and the axle bearing guiding means or pushrod without structural changes, existing rail vehicles can without difficulties be reconstructed in conformity with the present invention.

If the carriage is arranged on the axle bearing housing so as to be non-displaceable in vertical direction and is arranged on the axle bearing guiding means so as to be non-displaceable in horizontal direction, that surface of the carriage which faces toward the axle bearing housing acts as friction surface for damping the horizontal movements caused by transverse shocks, whereas that surface of the cariage which faces toward the axle bearing guiding means acts as friction surface for the vertical movements resulting from the shock absorption of the rail vehicle relative to the wheel axles. In the second instance, in which the carriage is non-displaceably arranged in horizontal direction on the axle bearing housing and is vertically non-displaceably arranged on the axle bearing guiding means, inverse conditions are obtained with regard to the relationship of the friction surface to the vertical and horizontal movements respectively of the axle bearing housing.

In view of the arrangement of the carriage according to the invention it is possible in a simple manner to provide both sides of the carriage and/or the axle bearing housing, the axle bearing guiding means and the pushrod with different friction linings while the carriage is preferably made of manganese containing steel. With rail vehicles which have a slight transverse play of the axles in their guiding means and are equipped with soft springs, the carriage, in order to obtain satisfactory spring properties, cooperates in vertical direction with a friction lining of synthetic material having a low friction value and in horizontal direction cooperates with a friction lining of metal, preferably steel, having a high friction value in order to bring about a satisfactory cushioning of the abutment shocks.

According to a further development of the bogie according to the invention it is suggested, between the carriage and the axle bearing housing or between the carriage and the pushrod or the axle bearing guiding means, to provide at least one pressure roller which for purposes of obtaining a slight damping rolls in vertical direction, whereas the horizontal damping is continued to be realized by friction linings with high friction value.

In order that for realizing the present invention already existing bogies will have to be altered only slightly, it is suggested, according to a further feature of the invention, to journal the pressure rollers rotatably on the pushrods so that merely the pushrods have to be exchanged and the carriages according to the invention have to be installed.

In order to avoid an unintentional slipping of the pressure rollers, the pressure rollers may, according to a further feature of the invention, be designed as toothed rollers so that an automatic rolling movement of the pressure rollers will occur in response to a movement of the axle bearing housing in vertical direction.

Figure 2:
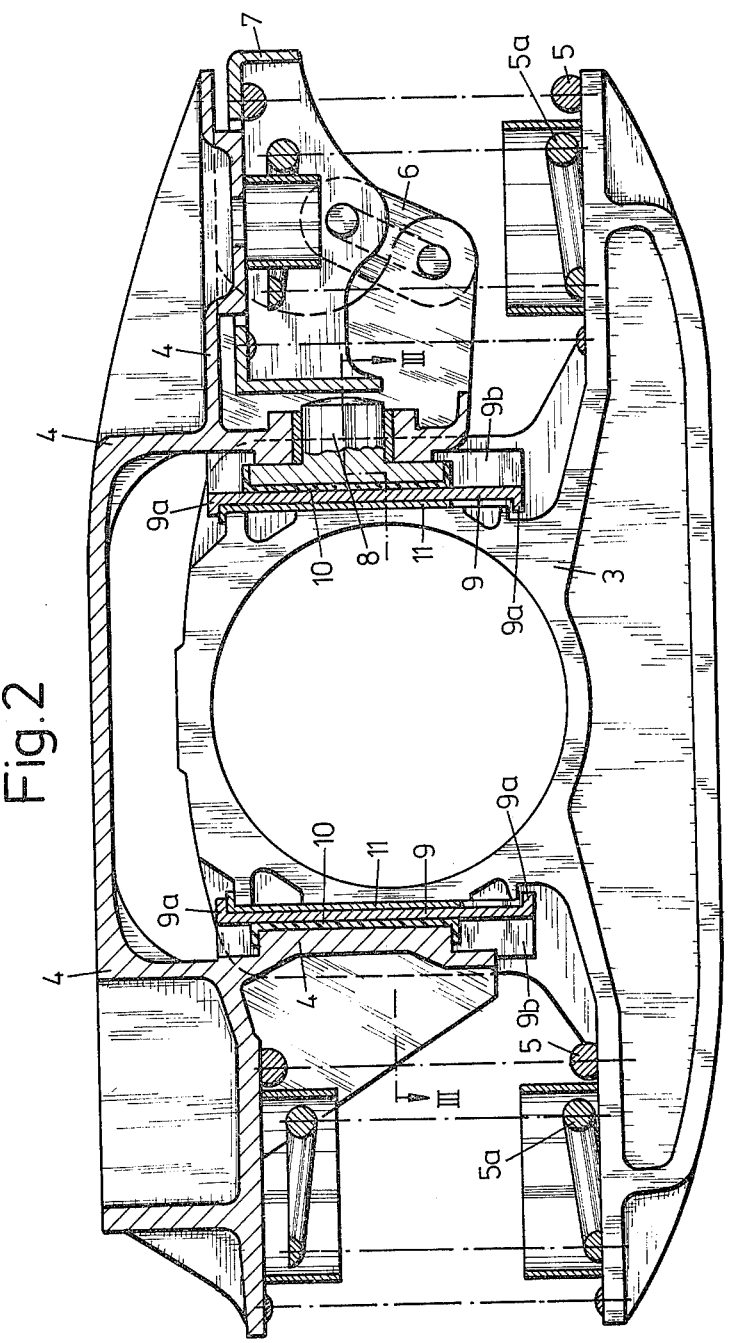
FIG. 2 shows a vertical section through the axle bearing guiding means of a first embodiment of the invention illustrating the arrangement of the carriage of the bogie.

Referring now to the drawings in detail, the overall view of the bogie as illustrated in FIG. 1 shows that the bogie has a bogie frame 1 having arranged thereon two wheel sets 2. The axles 2a (FIG. 3) of the wheel sets 2 are journalled in axle bearing housings 3 which are guided in axle bearing guiding means 4 of the bogie frame 1. Between each axle bearing housing 3 and the pertaining axle bearing guiding means 4 there are provided helical springs 5 which are arranged in pairs and which with the illustrated embodiment are equipped with inwardly located additional springs 5a. These additional or auxiliary springs 5a are best shown in FIG. 2.

The axle bearing housings 3 are movably guided by the axle bearing guiding means 4 not only for obtaining a cushioning in vertical direction but they are also to a limited extent movable in horizontal direction relative to the axle bearing means 4 in order to be able by a horizontal movement of the axles 2a relative to the bogie frame 1 to dampen the abutment shocks which occur in the rails during the continuous sinoidal movement of the wheel sets 2.

To this end, per each axle bearing housing 3 there are arranged two helical springs 5 and auxiliary springs 5a which are located directly between the axle bearing guiding means 4 and the axle bearing housing 3, whereas on the other side of the axle bearing housing 3 the upper spring dish 7 which is common to the helical spring 5 and the auxiliary spring 5a is through a spring link 6 linked to the axle bearing guiding means 4. The spring link 6 is inclined with regard to the wheel axle 2a. This inclination brings about that the force which is conveyed from the axle bearing guiding means 4 to the axle bearing housing 3 is split up into a vertical and into a horizontal component. While the vertical component is through the helical spring 5 and the auxiliary spring 5a conveyed directly to the axle bearing housing 3, the transfer of the horizontal force component from the upper spring dish 7 to the axle bearing housing 3 is effected through a pushrod 8 which is movably journalled in the axle bearing guiding means 4 for horizontal movement. This pushrod 8 thus exerts a load-dependent transverse force upon the axle bearing housing 3 which is movable in the axle bearing guiding means 4 and which cushions the vertical as well as the horizontal movement of the axle bearing housing 3 in view of the occurring friction.

In order to obtain a different damping for the vertical movement occurring in view of the spring effect and for the horizontal movement of the axle bearing housing 3 relative to the axle bearing guiding means 4 occurring in view of the abutment shocks, a carriage 9 is arranged between the pushrod 8 and the axle bearing housing 3. This carriage 9 is in vertical or horizontal direction non-movably held on the axle bearing housing 3 and in the respective other direction is non-displaceably held on the axle bearing guiding means 4. The carriage 9 will in this way create two separate friction surfaces, one of which will bring about the damping of the vertical movement whereas the other firction surface will bring about the damping of the horizontal movement betwen the axle bearing housing 3 and the axle bearing guiding means 4. In order to realize the same frictional conditions also on that side of the axle bearing housing 3 which is located opposite the pushrod 8, there is also on this side provided a corresponding carriage 9 between the axle bearing housing 3 and the axle bearing guiding means 4.

Figure 3:
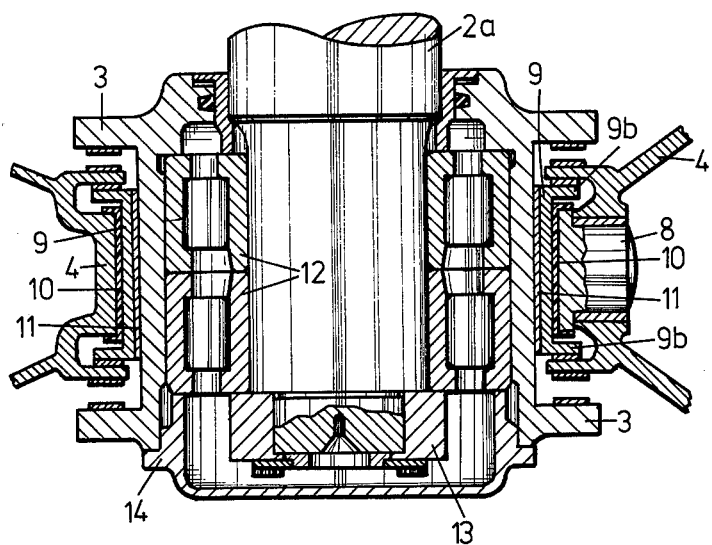
FIG. 3 is a horizontal section through the axle bearing, the axle bearing housing and the axle bearing guiding means according to FIG. 2.

According to the first embodiment of the arrangement of the carriage 9 in conformity with FIGS. 2 and 3, the horizontal edges of the carriage 9 are provided with bent-off portions 9a by means of which the carriage 9 is non-displaceably connected in vertical direction to the axle bearing housing 3. On the other hand, the vertical edges of the carriage 9 are provided with bent-off portions 9b which prevent a horizontal displacement of the carriage 9 relative to the axle bearing guiding means 4. This is particularly clearly shown in FIG. 3. By this mounting of the carriage 9 on the axle bearing housing 3 and the axle bearing guiding means 4 it will be assured that that surface of the carriage 9 which faces toward the wheel axle 2a will serve as friction surface for the cushioning of the horizontal movement between the axle bearing housing 3 and the axle bearing guiding means 4, whereas the other surface of the carriage 9 which faces toward the pushrod 8 and the axle bearing guiding means 4 serves as friction surface for cushioning the vertical movement of the axle bearing housing 3 relative to the axle bearing guiding means 4.

Inasmuch as for realizing good springing properties, the movement effect in vertical direction must be cushioned only to a slight degree, according to the embodiment of FIGS. 2 and 3, the pushrod 8 and the axle bearing guiding means 4 are provided with a friction lining 10 of low friction coefficient. Inasmuch as the carriage 9 is preferably made of manganese containing steel, as friction lining 10 preferably synthetic material is employed. For realizing the high friction coefficient necessary for cushioning the abutment shocks, between the axle bearing housing 3 and the carriage 9 there are provided metallic friction linings 11 which, according to the specific embodiment shown in the drawings, are connected to the axle bearing housing 3. It is, of course, also possible to arrange the friction linings 11 on the inner side of carriage 9 and to mount the friction lining 10 on the outside of the carriage 9.

FIG. 3 illustrates that the axle 2a is by means of axle bearing 12 journalled in the axle bearing housing 3, the axle bearings 12 being braced in axial direction by a bearing cover 13. The axle bearing housing 3 is closed toward the outside by means of a housing lid or cover 14 likewise shown in FIG. 3.

Figure 4:
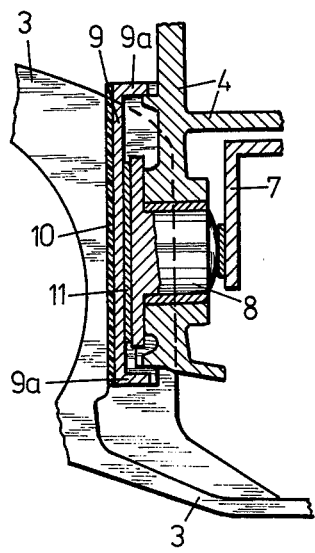
FIG. 4 is a vertical section similar to that of FIG. 2 showing a second way of arranging the carriage.
Figure 5:
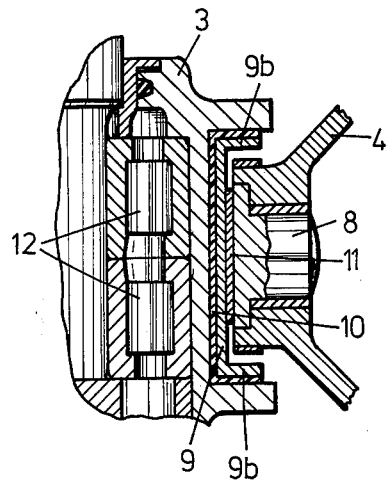
FIG. 5 represents similar to FIG. 3 a horizontal section through the second embodiment of the invention.

According to the second embodiment of the invention as illustrated in FIGS. 4 and 5, for the arrangement of the carriage 9, each carriage 9 is non-displaceably held on the axle bearing guiding means 4 by its horizontal bent-off portions 9a and is non-displaceabbly held on the axle bearing housing 3 by its vertical bent-off portions 9b. With this embodiment of the invention, the friction surface intended for cushioning the vertical movement is located between the carriage 9 and the axle bearing housing 3, whereas the friction surface intended for cushioning the horizontal movement is located between the carriage 9 and the pushrod 8 and the axle bearing guiding means 4. Accordingly, the friction lining 10 of synthetic material is arranged on that side of the carriage 9 which faces toward the axle bearing housing 3 and on the bent-off portions 9b, whereas the friction lining 11 of metal is connected to the pushrod 8 and axle bearing guiding means 4.

Figure 6:
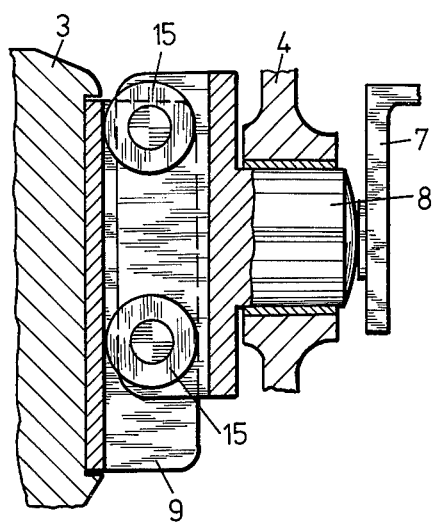
FIG. 6 is a vertical section through a pushrod equipped with pressure rollers for use in connection with the invention.
Figure 7:
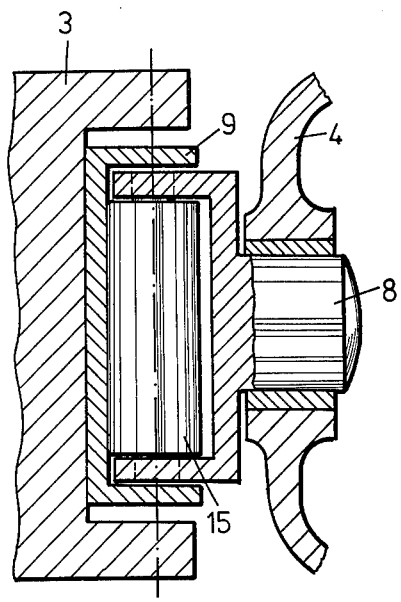
FIG. 7 is a horizontal section through a third embodiment according to FIG. 6.

According to the third embodiment of the invention as illustrated in FIGS. 6 and 7, the carriage 9 is horizontally non-displaceably connected to the pushrod 8 so that the horizontal movement of the axle bearing housing 3 is cushioned relative to the axle bearing guiding means 4 by the friction surface between the carriage 9 and the axle bearing housing 3. Inasmuch as both parts consist of steel, a high cushioning effect is realized. In view of the arrangement of pressure rollers 15 between the pushrod 8 and the carriage 9, on the other hand, a low friction is generated during the movements of the axle bearing housing 3 in vertical direction so that highly satisfactory springing or cushioning properties are realized for the bogie. According to the embodiment illustrated in FIGS. 6 and 7, the pressure rollers 15 are rotatably mounted on the pushrod 8. It is, of course, also possible to journal these pressure rollers 15 on the carriage 9.

Figure 8:
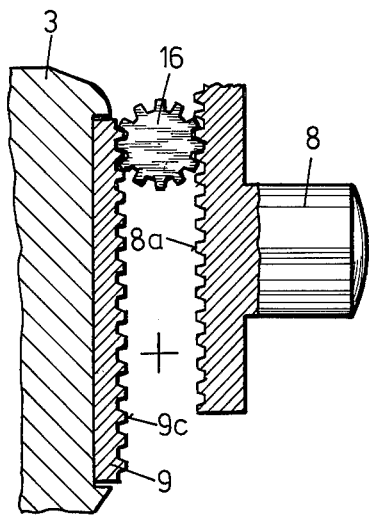
FIG. 8 illustrates a section similar to that of FIG. 6 through a fourth embodiment of the invention provided with teeth.
Figure 9:
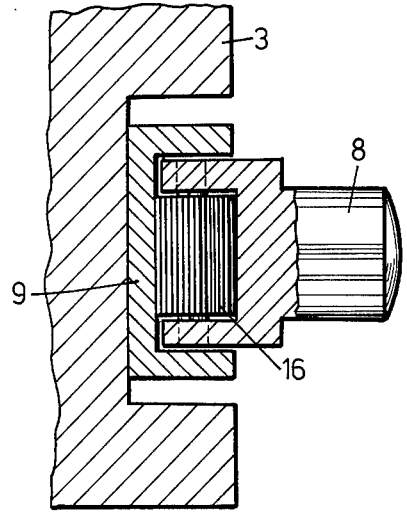
FIG. 9 is a horizontal section through the embodiment of FIG. 8.

According to the fourth embodiment of the invention as illustrated in FIGS. 8 and 9, instead of the arrangement of pressure rollers 15, toothed rollers 16 are provided which cooperate with corresponding teeth 9c, 8a of the carriage 9 and of the pushrod 8 respectively. By means of these teeth or gears it will be assured that also with high surface pressure a sliding between the rollers and the corresponding surfaces will be avoided and the rollers will be forced to roll.

It is, of course, to be understood that the present invention is, by no means, limited to the specific showing in the drawings but also comprises any modifications within the scope of the appended claims.

What we claim is:

1. A bogie for rail vehicles, which includes in combination a bogie frame, a pair of wheel axles, axle bearing means for said axles, two pairs of helical springs respectively associated with said wheel axles, said bogie frame resting in said wheel axles through the intervention of said pairs of springs, housing means for said axle bearing means, guiding means arranged in said bogie frame for vertically and horizontally guiding said wheel axles together with said housing means for said axle bearing means to cushion and absorb the transverse shocks occurring during the drive of said bogie, said helical springs being arranged on one side of each of said housing means directly between said axle bearing guiding means and said axle bearing housing means, said spring means including an upper spring dish located on the other side of said housing means, spring link means inclined to the respective adjacent wheel axle and linking said spring dish to the axle bearing guiding means, pushrod means displaceably mounted in said axle bearing guiding means and operatively connected to said axle bearing guiding means through said upper spring dish so as to be adapted to be pressed against said axle bearing housing means, friction lining means having entirely separate friction surfaces interposed between said pushrod and said axle bearing housing means on one hand and said guiding means for said axle bearing means and said axle bearing housing means on the other hand for purposes of differently cushioning the vertical and horizontal movements of said housing independently for said axle bearing means, two carriages respectively arranged between said pushrod means and said axle bearing housing means and between said guiding means for said axle bearing means and said axle bearing housing means, and interengaging channel-shaped members separated by at least one pressure roller journalled to one of the members as provided between each carriage and the pertaining axle bearing housing and adapted in vertical direction to roll therebetween.

2. A bogie in combination according to claim 1, in which both sides of said carriages are provided with different friction linings.

3. A bogie in combination according to claim 1, in which said carriages are made of steel and in vertical direction cooperate with a friction lining of synthetic material having a lower coefficient of friction than steel, and in which said carriages in horizontal direction cooperate with a friction lining of metal having a relatively high coefficient of friction.

4. A bogie in combination according to claim 3, in which said carriages are made of manganese containing steel.

5. A bogie in combination according to claim 3, in which said carriages in horizontal direction cooperate with a friction lining of steel with a relatively high coefficient of friction.

6. A bogie for rail vehicles, which includes in combination a bogie frame, a pair of wheel axles, axle bearing means for said axles, two pairs of helical springs respectively associated with said wheel axles, said bogie frame resting in said wheel axles through the intervention of said pairs of springs, housing means for said axle bearing means, guiding means arranged in said bogie frame for vertically and horizontally guiding said wheel axles together with said housing means for said axle bearing means to cushion and absorb the transverse shocks occurring during the drive of said bogie, said helical springs being arranged on one side of each of said housing means directly between said axle bearing guiding means and said axle bearing housing means, said spring means including an upper spring dish located on the other side of said housing means, spring link means inclined to the respective adjacent wheel axle and linking said spring dish to the axle bearing guiding means, pushrod means displaceably mounted in said axle bearing guiding means and operatively connected to said axle bearing guiding means through said upper spring dish so as to be adapted to be pressed against said axle bearing housing means, friction lining means having entirely separate friction surfaces interposed between said pushrod and said axle bearing housing means on one hand and said guiding means for said axle bearing means and said axle bearing housing means on the other hand for purposes of differently cushioning the vertical and horizontal movements of said housing independently for said axle bearing means, two carriages respectively arranged between said pushrod means and said axle bearing housing means and between said guiding means for said axle bearing means and said axle bearing housing means, and interengaging channel-shaped members separated by at least one pressure roller journalled to one of the members as provided between each carriage and the pertaining pushrod and adapted in vertical direction to roll therebetween.

7. A bogie in combination according to claim 6, in which the axle bearing housing means and said guiding means for said axle bearing as well as said pushrod are provided with different friction linings.

8. A bogie in combination according to claim 6, in which said pressure roller is rotatably supported by said pushrod.

9. A bogie for rail vehicles, which includes in combination a bogie frame, a pair of wheel axles, axle bearing means for said axles, two pairs of helical springs respectively associated with said wheel axles, said bogie frame resting in said wheel axles through the intervention of said pairs of springs, housing means for said axle bearing means, guiding means arranged in said bogie frame for vertically and horizontally guiding said wheel axles together with said housing means for said axle bearing means to cushion and absorb the transverse shocks occurring during the drive of said bogie, said helical springs being arranged on one side of each of said housing means directly between said axle bearing guiding means and said axle bearing housing means, said spring means including an upper spring dish located on the other side of said housing means, spring link means inclined to the respective adjacent wheel axle and linking said spring dish to the axle bearing guiding means, pushrod means displaceably mounted in said axle bearing guiding means and operatively connected to said axle bearing guiding means through said upper spring dish so as to be adapted to be pressed against said axle bearing housing means, friction lining means having entirely separate friction surfaces interposed between said pushrod and said axle bearing housing means on one hand and said guiding means for said axle bearing means and said axle bearing housing means on the other hand for purposes of differently cushioning the vertical and horizontal movements of said housing independently for said axle bearing means, two carriages respectively arranged between said pushrod means and said axle bearing housing means and between said guiding means for said axle bearing means and said axle bearing housing means, and interengaging channel-shaped members separated by at least one pressure roller journalled to one of the membes as provided between each carriage and the pertaining guiding means for the pertaining axle bearing means and adapted in vertical direction to roll therebetween.

10. A bogie in combination according to claim 9, in which each of said carriages is non-displaceably held in vertical direction on said axle bearing housing means, and is non-displaceably held in horizontal direction on said guiding means for said axle bearing means.

11. A bogie in combination according to claim 9, in which each of said carriages is non-displaceably held in horizontal direction on said axle bearing housing means, and is non-displaceably held in vertical direction on said guiding means for said axle bearing means.

12. A bogie for rail vehicles, which includes in combination a bogie frame, a pair of wheel axles, axle bearing means for said axles, two pairs of helical springs respectively associated with said wheel axles, said bogie frame resting in said wheel axles through the intervention of said pairs of springs, housing means for said axle bearing means, guiding means arranged in said bogie frame for vertically and horizontally guiding said wheel axles together with said housing means for said axle bearing means to cushion and absorb the transverse shocks occurring during the drive of said bogie, said helical springs being arranged on one side of each of said housing means directly between said axle bearing guiding means and said axle bearing housing means, said spring means including an upper spring dish located on the other side of said housing means, spring link means inclined to the respective adjacent wheel axle and linking said spring dish to the axle bearing guiding means, pushrod means displaceably mounted in said axle bearing guiding means and operatively connected to said axle bearing guiding means through said upper spring dish so as to be adapted to be pressed against said axle bearing housing means, friction lining means having entirely separate friction surfaces interposed between said pushrod and said axle bearing housing means on one hand and said guiding means for said axle bearing means and said axle bearing housing means on the other hand for purposes of differently cushioning the vertical and horizontal movements of said housing independently for said axle bearing means, two carriages respectively arranged between said pushrod means and said axle bearing housing means and between said guiding means for said axle bearing means and said axle bearing housing means, and interengaging channel-shaped members separated by at least one pressure roller journalled to one of the members, each carriage having associated therewith a pressure roller in the form of a toothed roller, and the surface cooperating with said pressure roller being provided with corresponding teeth forming a rack.

* * * * *